United States Patent
Young et al.

(10) Patent No.: US 6,898,624 B2
(45) Date of Patent: May 24, 2005

(54) SYSTEM AND METHOD PROVIDING AN EMBEDDED WEB SERVER FACSIMILE SERVICE

(75) Inventors: Bruce M. Young, Boise, ID (US); Michael P. Prenn, Star, ID (US); Richard G. Lea, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 800 days.

(21) Appl. No.: 09/814,316

(22) Filed: Mar. 19, 2001

(65) Prior Publication Data

US 2004/0205115 A1 Oct. 14, 2004

(51) Int. Cl.$^7$ .......................... G06F 15/16; G06F 15/00
(52) U.S. Cl. ..................................... 709/206; 358/1.15
(58) Field of Search ................................ 709/206, 203, 709/218, 227, 228, 230; 358/1.15, 407; 379/100.07, 100.08, 100.15, 100.17

(56) References Cited

U.S. PATENT DOCUMENTS

| | | | | |
|---|---|---|---|---|
| 5,675,507 A | * | 10/1997 | Bobo, II | 709/206 |
| 5,907,598 A | * | 5/1999 | Mandalia et al. | 379/100.01 |
| 5,956,487 A | * | 9/1999 | Venkatraman et al. | 709/218 |
| 6,023,345 A | * | 2/2000 | Bloomfield | 358/402 |
| 6,170,007 B1 | * | 1/2001 | Venkatraman et al. | 709/218 |
| 6,424,426 B1 | * | 7/2002 | Henry | 358/1.15 |
| 6,626,957 B1 | * | 9/2003 | Lippert et al. | 715/513 |
| 2002/0018234 A1 | * | 2/2002 | Fu et al. | 358/1.15 |
| 2003/0018720 A1 | * | 1/2003 | Chang et al. | 709/206 |
| 2003/0095542 A1 | * | 5/2003 | Chang et al. | 370/352 |

FOREIGN PATENT DOCUMENTS

EP    1109113 A2 *  6/2001   ........... G06F/17/30

OTHER PUBLICATIONS

Dan Littman, "HP Ships New Network Cards for Old Printers", PCWORLD, Feb. 10, 1999.*
Cheryl Currid. "Turn on your Web printer", Information Week, Manhasset, Jun. 29, 1998, ISS. 689; p. 162, 1 pgs.*

* cited by examiner

Primary Examiner—William A. Cuchlinski, Jr.
Assistant Examiner—Yemane M. Gerezgiher

(57) ABSTRACT

The described system and procedure provides fax delivery services to a user that only has convenient access to a single-function networked printer device. To accomplish this, the system receives a facsimile sent to a telephone number. Responsive to receiving the facsimile, the facsimile is converted from a fax data format to a printable data format that is compatible with a printer device. Next, the converted facsimile is wrapped in a network transfer protocol language such as Hypertext Transfer Protocol to form a Web Page. Next, a Universal Resource Locator (URL) is identified that corresponds to the telephone number used to send the facsimile to the system. The URL identifies an embedded web server in a printer. Next, the Web page containing the converted facsimile is communicated to the identified embedded web server for printing by the printer.

32 Claims, 3 Drawing Sheets

SYSTEM AND METHOD PROVIDING AN EMBEDDED WEB SERVER FACSIMILE SERVICE

TECHNICAL FIELD

The following description relates to a facsimile service. More particularly, the following description relates to using an embedded web server in a printer to provide facsimile services in addition to printer services.

BACKGROUND

There is a strong trend toward convergence of functionality in the printing, copying, scanning, and facsimile industries. This is evidenced by the availability of various types of multi-function devices that provide two or more of copying, printing, scanning, or facsimile functionalities. However, multi-function devices are not as prolific in home or business environments as are traditional single-function devices such as single-function facsimile machines and printers.

Commonly, someone having only a single-function device such as a networked printer desires to receive a facsimile when he/she does not have convenient access to a facsimile device. This problem is typically resolved in one of a number of different ways. For example, a party desiring to receive a facsimile can have it sent to a third-party facsimile service provider. However, receiving facsimiles at such a third-party provider is typically inconvenient because the facsimile must, in some manner, be picked-up from the third-party or delivered to the intended recipient. Moreover, receiving facsimiles at such a third-party provider is often not an option for any one of number of reasons such as confidentiality concerns.

Another way to solve the described problem is to obtain another device such as another single-function device or a multi-function device that is configured to receive and print facsimiles. Separate printer and facsimile devices typically require more space, or "real-estate" to store than does a single multi-function device that provides both printing and facsimile services. However, multi-function devices are generally more expensive to purchase and/or maintain as compared to the cost and/or maintenance of respective single-function devices.

Ideally, someone having only a single-function printer device who desires to receive a facsimile transmission would not be required to: (a) receive facsimiles at a third-party facsimile service provider; or, (b) obtain another device, regardless of whether the other device is a single-function device or a multi-function device, to receive the facsimile. In this manner, a single-function printer would become more valuable and more useful in a home or business environment.

Accordingly, the various embodiments of the subject matter described below arose out of concerns associated with the above described scenario where someone with a single-function network printer device desires to receive a facsimile when they do not have convenient access to a facsimile device.

SUMMARY

The described system and procedure provides facsimile delivery to a user that only has access to a single-function networked printer device. To accomplish this, the system receives a facsimile sent to a telephone number. Responsive to receiving the facsimile, the facsimile is converted from a facsimile data format to a printable data format that is compatible with a printer device. Next, the converted facsimile is wrapped in a network transfer protocol language such as Hypertext Transfer Protocol to form a Web Page.

Next, a Universal Resource Locator (URL) is identified that corresponds to the telephone number used to send the facsimile to the system. The URL identifies an embedded web server in a printer. Next, the Web page comprising the converted facsimile is communicated to the identified embedded web server for printing by the printer. In this manner, the described system and procedure provides a facsimile delivery service to a user that does not have convenient access to a traditional facsimile device, but rather only has access to a single-function networked printer device.

BRIEF DESCRIPTION OF THE DRAWINGS

The same numbers are used throughout the drawings to reference like features and components.

DETAILED DESCRIPTION

The following description sets forth a specific embodiment of a system and procedure that incorporates elements recited in the appended claims. The embodiment is described with specificity in order to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary System

Figure 1:
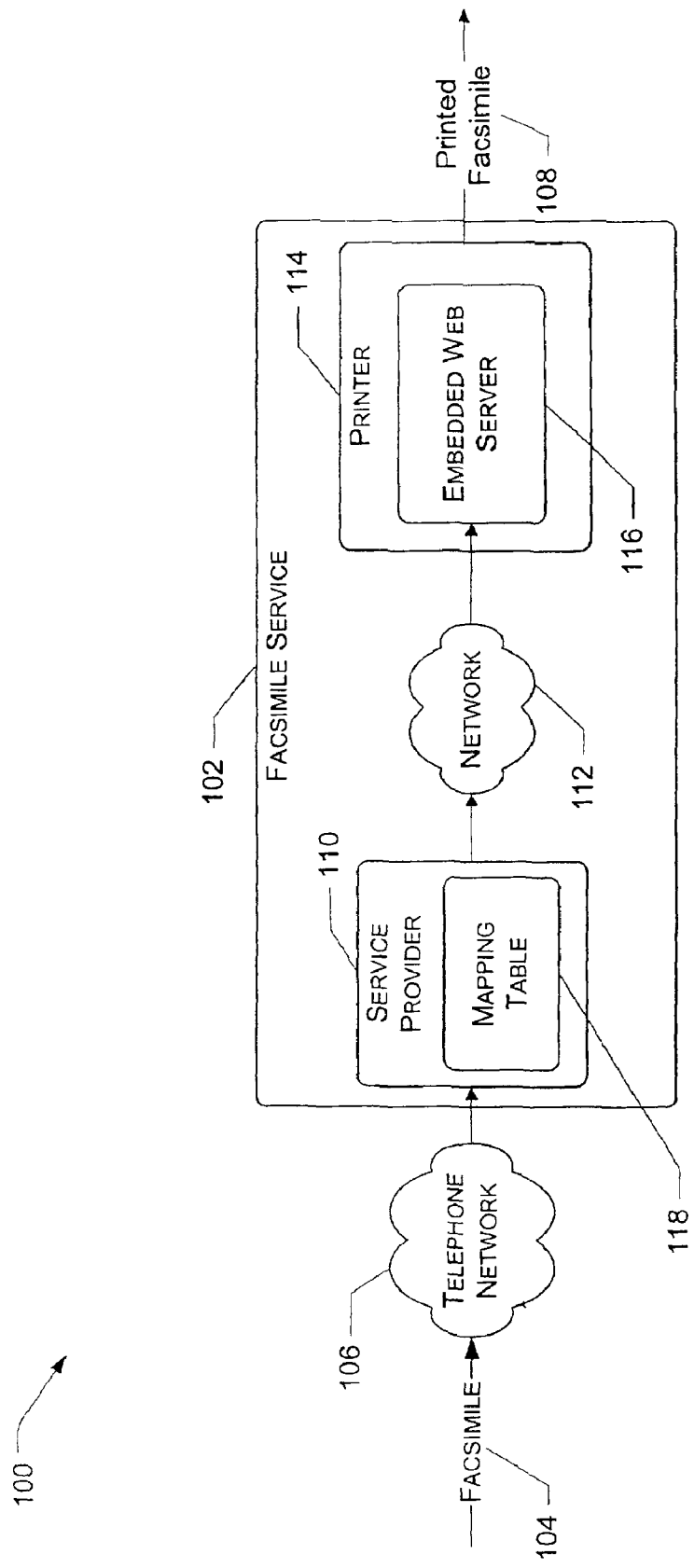
FIG. 1 is a block diagram of exemplary components of a facsimile services system to receive and print facsimiles at a networked printer.

FIG. 1 is a block diagram of an exemplary facsimile services system 100 to receive and print facsimiles, or "faxes". System 100 provides convenient "fax to me" capabilities to users having only a networked printer without requiring a user to purchase a separate facsimile machine to receive a fax, and without requiring the user to receive facsimiles at a third-party facsimile service provider. Moreover, because system 100 obviates the need for a user to have access to a separate fax machine to receive faxes, system 100 reduces that amount of space that would otherwise be needed to use and store a separate fax capable device. In this manner, the described system makes a single-function printer more valuable and more useful in a home or business environment.

System 100 includes a facsimile service 102 coupled to a telephone network 106 such as a public telephone network. The facsimile service comprises a service provider 110 such as a Point of Presence (POP) service provider. The service provider is operatively coupled to a network of computers such as the Internet 112. The Internet is operatively coupled to one or more networked printers 114. Each network printer comprises an embedded web server 116. The embedded web server ("EWS") communicates with the service provider using a network transfer protocol such as the Hypertext Transfer Protocol (HTTP) to receive and serve web page documents.

A facsimile, or "fax" 104 is a document that comprises text and/or graphics. The fax is transmitted from a fax machine (not shown) through the telephone network 106 to the service provider 110. The fax machine can be any type of device such as a conventional fax machine or a personal computer ("PC").

To transmit the document, the fax machine converts the contents of the document into a facsimile transmission format, and using a predetermined phone number, transmits the converted document over the telephone network 106 to the service provider 110. Facsimile transmission formats are well-known to those skilled in the art of computer programming facsimile products. Where a PC is employed as a fax machine, the PC is provided with a facsimile compatible modem and translation software for converting contents of a document to a facsimile transmission format.

In one embodiment, the predetermined phone number used to transmit the fax to a service provider 110 is assigned by the service provider to an entity when the entity subscribes to a "fax receive via EWS" service. Such a service provides fax delivery to the entity if the entity has an EWS equipped printer 116, independent of whether the printer can parse a facsimile transmission data format. The entity is free to distribute the assigned telephone number to those who wish to send a fax to the entity.

A unique Universal Resource Locator (URL) is assigned by a network administrator to the entity's EWS network printer 116. The assigned URL is mapped at the service provider to the provided telephone number.

In this implementation, the URL/telephone number mapping is stored in mapping table 118. Mapping table 118 comprises one or more predetermined telephone numbers, wherein each telephone number corresponds to a unique URL that is assigned to a particular EWS enabled printer 114. The mapping table is stored on a database (not shown) or any other type or combination of non-volatile or volatile data storage that is operatively coupled to the service provider 110.

Responsive to receipt of the facsimile 104, the service provider 110 identifies the unique URL that was mapped to the telephone number used to transmit the facsimile 104 to the service provider. This can be accomplished using mapping table 118. As noted above, the identified URL corresponds to a particular EWS 116 in a printer 114. Next, the service provider 110 converts the received facsimile 104 from a facsimile transmission format into a specific printer format that corresponds to the particular printer. Printer formats include, for example, Portable Document Format (PDF), Graphics Interchange Format (GIF), Joint Photographic Experts Group (JPG) format, American Standard Code for Information Interchange (ASCII) format, and Printer Control Language (PCL) format.

A service provider determines a specific printer format to use in the facsimile format to printer format conversion procedure in a number of different ways. In one implementation, the service provider sends a message to the identified URL to determine the particular printer format that the printer 114 requires or prefers. Such a message can be sent using a network transfer protocol such as HTTP. In yet another embodiment, the service provider determines required or preferred printer data formats when an entity signs up with the service provider for a service such as a "fax-receive via EWS" service. Such printer data formats are stored in mapping table 118 in a manner that identifies such printer data formats on a printer-by-printer basis.

Next, the service provider wraps the converted fax data in a network transfer protocol such as HTTP so that the converted fax data can be sent as a Web page to the EWS 116 in the printer 114. In one embodiment, the Web page containing the converted fax data includes header information that identifies the Web page as a "fax job". Responsive to parsing such header information, a recipient such as the printer 114 is able to differentiate a Web page that includes a fax from any other type of Web page.

Next, the service provider 110 communicates the Web page containing the converted fax data over the Internet 112 to the address of the identified URL. In this manner the converted fax is transmitted to the appropriate EWS 116 in the corresponding EWS enabled printer. The EWS 116 receives the incoming "fax job", which looks like a print job because the fax has already been converted from the facsimile transmission format as discussed above, to a printer compatible data format. The EWS extracts the converted fax data from the received Web page and communicates the extracted fax data to the printer 114, which in turn prints the converted fax out.

In one implementation, responsive to receiving the fax job, the EWS 116 sends a status message to the service provider 110. Such a status message includes information that corresponds to the fax job such as a successful print indication, a failed print indication, a printer toner out indication, or a paper jam indication. The status message can be sent back to the service provider in a number of different ways such as through the Internet as a Web page, or as an electronic mail ("e-mail") message. Where the status message is a successful print indication, the message indicates a "guaranteed fax delivery" service to the message recipient.

In one implementation, responsive to receiving the status message from the EWS 116, the service provider 110 communicates a notification that corresponds to the status message to any one of a number of entities. Such entities include, for example, the sending fax machine (via typical fax protocols), the printer 114, an e-mail address, a pager number, a Personal Digital Assistant (PDA), or to a mobile phone number.

Exemplary Procedure

Figure 2:
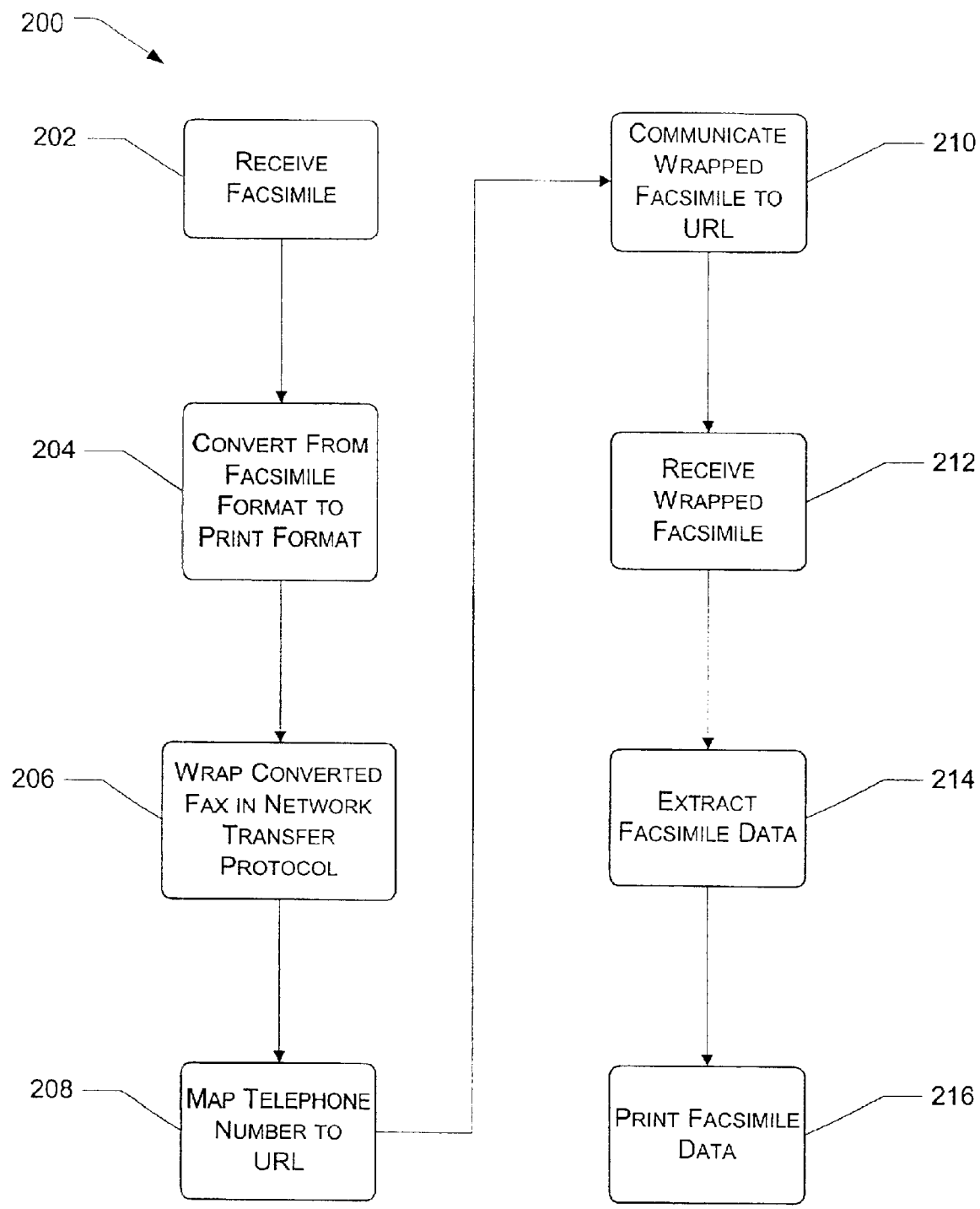
FIG. 2 is a flowchart diagram of an exemplary procedure for an embedded web server in a networked printer to receive and print facsimiles.

FIG. 2 is a flowchart diagram of an exemplary procedure 200 for an embedded web server in a networked printer to receive and print facsimiles. Step 202 receives a facsimile sent to a telephone number. Step 204, responsive to receiving the facsimile (step 202), converts the facsimile from a fax data format to a printable data format. Step 206 wraps the converted facsimile in a network transfer protocol language to send the converted facsimile to an embedded web server enabled printer as a Web page. Step 208 identifies a Universal Resource Locator (URL) that corresponds to the telephone number, the URL identifies the embedded web server in the printer. Step 210 communicates the wrapped facsimile, or "Web page" to the embedded web server for printing by the printer. Step 212 receives the wrapped facsimile. Step 214 extracts the converted facsimile data from the wrapped facsimile. Step 216 prints the extracted facsimile data.

Alternative Embodiment

Figure 3:
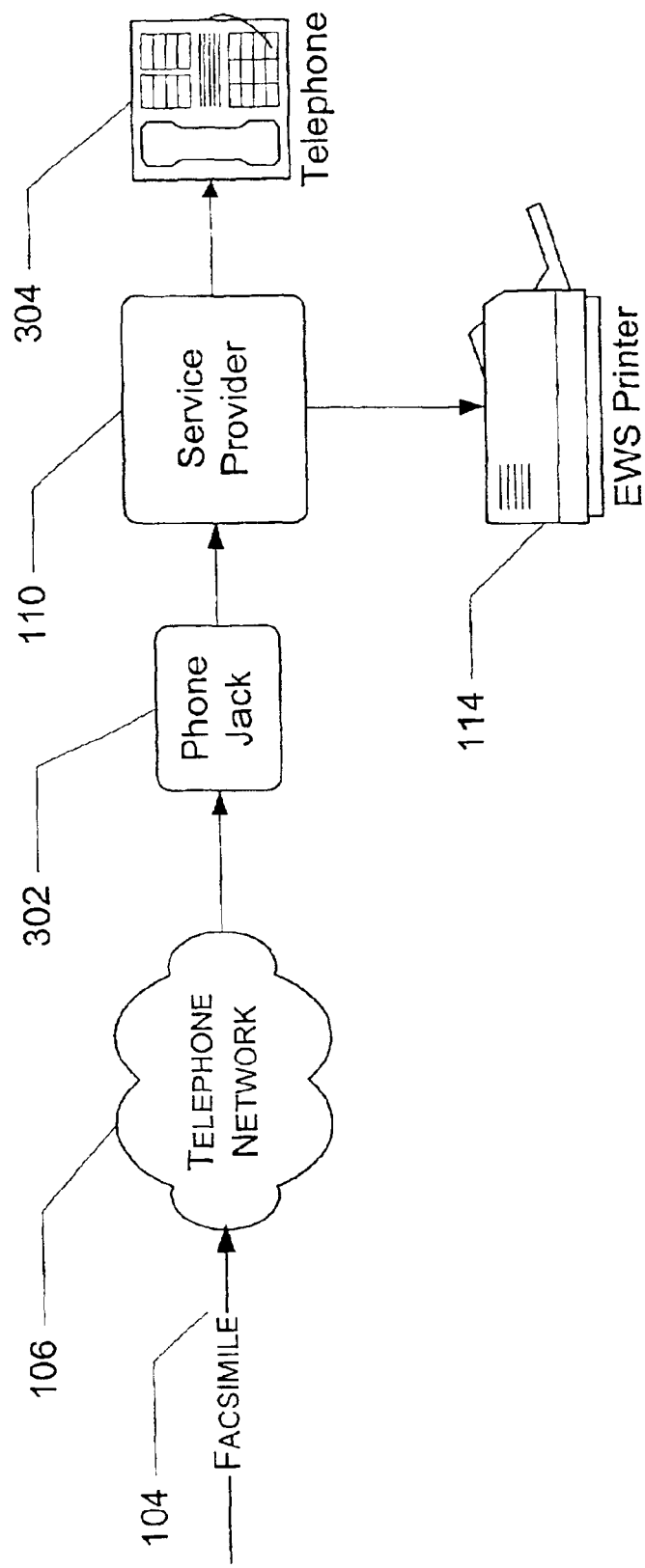
FIG. 3 is a block diagram that illustrates aspects of an alternative system to receive and print facsimiles at a networked printer.

FIG. 3 is a block diagram that illustrates aspects of an exemplary alternative system 300 to receive and print facsimiles 104 at a networked printer 114. Service provider 110 of FIG. 1 is provided at or near an EWS enabled printer 114.

In this implementation, service provider 110 is a device such as a modem or Line Interface Unit (LIU), which is operatively coupled between a telephone line input jack 302, a telephone 304, and the EWS enabled printer. The device can be a dedicated standalone device, a device implemented in a print server such as a JetDirect® print server manufactured by Hewlett Packard Corporation, the EWS enabled printer itself, or the like.

The device 110 is programmed by a user with the printer's assigned URL. There are a number of different ways that such a device can be programmed with the printer's assigned URL. For example, a serial cable (not shown) coupled to a computer (not shown) can be coupled to a serial port (not shown) on the device 110. The URL data is downloaded from the computer to the device. In yet another example, a user programs the device with URL data by setting one or more jumpers (not shown) on the device.

Responsive to receiving a facsimile transmission 104, a device 110 identifies the transmission as a facsimile transmission. Procedures for determining whether a received set of data corresponds to a facsimile transmission or a voice communications transmission are known in the art of telecommunications. Rather than routing the identified facsimile transmission to the telephone 304, the device performs the facsimile format to printer format conversion procedures, as well as the converted/wrapped facsimile transmission to the EWS enabled printer 114, which are described in greater detail above with respect to FIGS. 1–2.

Conclusion

Traditional procedures typically require an entity who only has access to a single-function networked printer device, either to obtain another device to receive a facsimile, or to receive the facsimile at a third-party facsimile service provider. Moreover, traditional fax machines typically require a dedicated telephone line in the home or business environment that is coupled to a fax machine to receive facsimiles.

In contrast to such traditional systems and procedures, the described systems and procedures of FIGS. 1–3 provide fax delivery to a user that only has convenient access to a single-function networked printer device. Moreover, aspects of the described subject matter provide such fax delivery services to the user without requiring the user to have a separate dedicated telephone line in a home or business environment to receive fax delivery. Thus, the described subject matter makes a single-function printer more valuable and useful in a home or business environment as compared to traditional single-function printers.

Although details of specific implementations and embodiments are described above, such details are intended to satisfy statutory disclosure obligations rather than to limit the scope of the following claims. Thus, the subject matter as defined by the claims is not limited to the specific features described above. Rather, the subject matter is claimed in any of its forms or modifications that fall within the proper scope of the appended claims, appropriately interpreted in accordance with the doctrine of equivalents.

We claim:

1. A method providing a facsimile service, the method comprising:
   receiving a facsimile sent to a telephone number;
   responsive to receiving the facsimile:
   (a) converting the facsimile from a fax format to a printable data format;
   (b) wrapping the converted facsimile in a network transfer protocol language;
   (c) identifying a Universal Resource Locator (URL) that corresponds to the telephone number, the URL identifying an embedded web server in a printer; and
   (d) communicating the wrapped facsimile to the embedded web server for printing by the printer.

2. A method as recited in claim 1, wherein the network transfer protocol language is HTTP or XML.

3. A method as recited in claim 1, wherein the printable data format comprises a PDF format, a GIF format, a JPG format, an ASCII format, or a PCL format.

4. A method as recited in claim 1, wherein the method is performed by a Point of Presence (POP) service provider.

5. A method as recited in claim 1, wherein the method is performed by a service provider that is implemented on the printer.

6. A method as recited in claim 1, wherein the method is performed by a service provider that is implemented between a phone jack, a telephone, and the printer.

7. A method as recited in claim 1, the method further comprising:
   responsive to the communicating, receiving a message from the web server, the message corresponding to a status of the communicated facsimile.

8. A method as recited in claim 1:
   wherein in the receiving, the facsimile is received by a server; and
   wherein the wrapped facsimile comprises a header that indicates an address that corresponds to the server; and,
   wherein the method further comprises:
   responsive to communicating the wrapped facsimile to the embedded web server, receiving a message from the embedded web server at the address, the message corresponding to a status of the communicated facsimile.

9. A method as recited in claim 8:
   wherein the URL is a first URL;
   wherein the address is selected from a set of addresses that comprise an e-mail address or a second URL; and
   wherein the message comprises a successful print indication, a paper out indication, a toner out indication, or a paper jam indication.

10. A method as recited in claim 1:
    wherein in the receiving, the facsimile is sent by a sender;
    the method further comprising:
    responsive to the communicating, receiving a message from the web server that corresponds to the communicated facsimile; and
    responsive to receiving the message, forwarding a status to an entity selected from a group of entities comprising the sender or the embedded web server, the status indicating success or failure of the communicating.

11. One or more computer-readable media containing a computer executable program that performs a method as recited in claim 1.

12. A method comprising:
    receiving, by a service provider, a facsimile sent to a telephone number;
    responsive to receiving the facsimile:
    (a) converting the facsimile from a fax format to a printable data format;
    (b) wrapping the converted facsimile in a network transfer protocol language;
    (c) identifying a Universal Resource Locator (URL) that corresponds to the telephone number; the URL identifying a web server module that is embedded in a printer;

(d) communicating the wrapped facsimile to the web server for printing by the printer;

(e) receiving, by the web server module, the communicated facsimile; and (f) responsive to receiving the communicated facsimile, printing, by the printer, the communicated facsimile.

13. A method as recited in claim 12, wherein the network transfer protocol language is HTTP.

14. A method as recited in claim 12, wherein the printable data format comprises a PDF format, a GIF format, a JPG format, an ASCII format, or a PCL format.

15. A method as recited in claim 12, the method further comprising:

responsive to the communicating, receiving, by the service provider, a message from the web server module, the message corresponding to a status of the communicated facsimile.

16. A method as recited in claim 12:

wherein the wrapped facsimile comprises a header that indicates an address that corresponds to the service provider; and, wherein the method further comprises:

responsive to communicating the wrapped facsimile to the web server module, receiving a message from the web server module at the address, the message corresponding to a status of the communicated facsimile.

17. A method as recited in claim 16:

wherein the URL is a first URL;

wherein the address is selected from a set of addresses that comprise an e-mail address or a second URL; and wherein the message comprises a successful print indication, a paper out indication, a toner out indication, or a paper jam indication.

18. A method as recited in claim 12:

wherein in the receiving, the facsimile is sent by a sender; and wherein the method further comprises:

responsive to the communicating, receiving a message, by the service provider, from the web server module, the message corresponding to the communicated facsimile; and responsive to receiving the message, forwarding, by the service provider, a status to an entity selected from a group of entities comprising the sender or the web server module, the status indicating success or failure of the communicating.

19. One or more computer-readable media containing a computer executable program that performs a method as recited in claim 12.

20. An apparatus comprising:

a service provider module operatively coupled to a telephone network;

an embedded web server module that is operatively coupled to the service provider module; and a printer module operatively coupled to the embedded web server module;

wherein the service provider module is configured to receive a facsimile sent to a telephone number that corresponds to the embedded web server module, and communicate the facsimile to the embedded web server module in a manner that enables the printer module to print the communicated facsimile.

21. An apparatus as recited in claim 20, wherein the service provider module is further configured to:

(a) convert the facsimile from a fax format to a printable data format;

(b) wrap the converted facsimile in a network transfer protocol language;

(c) identify a Universal Resource Locator (URL) that corresponds to the telephone number, the URL identifying the web server module; and (d) communicate the wrapped facsimile to URL.

22. An apparatus as recited in claim 20, wherein the embedded web server module is configured to receive the wrapped facsimile from the service provider module, and responsive to receiving the wrapped facsimile, the embedded web server module is further configured to send the facsimile to the printer module for printing.

23. An apparatus as recited in claim 20, wherein the printer module is configured to receive the facsimile from the embedded web server module, and responsive to receiving the facsimile, the printer module is further configured to print the facsimile.

24. An apparatus as recited in claim 21, wherein the network transfer protocol language is HTTP.

25. An apparatus as recited in claim 21, wherein the printable data format comprises a PDF format, a GIF format, a JPG format, an ASCII format, or a PCL format.

26. An apparatus as recited in claim 20:

wherein the embedded web server module is further configured to forward a message corresponding to the communicated facsimile to the service provider module in response to the communicated facsimile being successfully printed.

27. An apparatus as recited in claim 26, wherein the message comprises a successful print indication, a paper out indication, a toner out indication, or a paper jam indication.

28. An apparatus as recited in claim 21:

wherein the wrapped facsimile comprises a header that indicates an address that corresponds to the service provider module; and, wherein the service provider module is further configured to receive a message from the web server module at the address, the message corresponding to a status of the communicated facsimile.

29. An apparatus as recited in claim 20:

wherein the service provider module is further configured to receive a message from the web server module that corresponds to the communicated facsimile, and wherein the service provider module is further configured to forward the message to an originator of the facsimile.

30. An apparatus as recited in claim 29, wherein the message comprises a successful print indication, a paper out indication, a toner out indication, or a paper jam indication.

31. A printer comprising:

an embedded web server that is configured to receive an HTTP message that comprises a facsimile message sent to a telephone number, the fax message having been converted from a facsimile format to a printer format; and wherein the printer is configured to print the facsimile message.

32. A printer as recited in claim 31, wherein the printer format comprises a PDF format, a GIF format, a JPG format, an ASCII format, or a PCL format.

* * * * *